US007895973B1

(12) United States Patent
Whelan

(10) Patent No.: US 7,895,973 B1
(45) Date of Patent: Mar. 1, 2011

(54) AUTOMATIC FEEDING SYSTEM, DEVICE AND METHOD

(76) Inventor: Steve Whelan, Santa Clara, CA (US)

( * ) Notice: Subject to any disclaimer, the term of this patent is extended or adjusted under 35 U.S.C. 154(b) by 204 days.

(21) Appl. No.: 11/307,836

(22) Filed: Feb. 24, 2006

(51) Int. Cl.
*A01K 1/00* (2006.01)
(52) U.S. Cl. .................................. 119/51.02
(58) Field of Classification Search .............. 119/51.02, 119/840–844, 51.13
See application file for complete search history.

(56) References Cited

U.S. PATENT DOCUMENTS

| | | | |
|---|---|---|---|
| 3,557,758 A | 1/1971 | Lack | |
| 3,985,104 A | 10/1976 | Klemer | |
| 4,022,263 A * | 5/1977 | Beckett et al. ................ | 160/92 |
| 4,129,855 A | 12/1978 | Rodrian | |
| 4,248,175 A | 2/1981 | Navarro | |
| 4,262,632 A | 4/1981 | Hanton et al. | |
| 4,315,483 A | 2/1982 | Scheidler | |
| 4,355,598 A | 10/1982 | Saylor | |
| 4,421,059 A | 12/1983 | Cousino | |
| 4,644,903 A | 2/1987 | Shaver | |
| 4,663,625 A | 5/1987 | Yewen | |
| 4,671,210 A | 6/1987 | Robinson et al. | |
| 4,694,780 A | 9/1987 | Keuter et al. | |
| 5,239,943 A | 8/1993 | Kim | |
| 5,351,649 A | 10/1994 | Rovira Badia et al. | |
| 5,398,643 A | 3/1995 | McElrath et al. | |
| 5,433,171 A | 7/1995 | Ewell | |
| 5,548,291 A | 8/1996 | Meier et al. | |
| 5,614,890 A | 3/1997 | Fox | |
| 5,669,328 A | 9/1997 | Lanfranchi | |
| 5,899,169 A * | 5/1999 | Jenson ..................... | 119/51.13 |
| 6,044,795 A | 4/2000 | Matsuura et al. | |
| 6,349,671 B1 * | 2/2002 | Lewis et al. .............. | 119/51.02 |
| 6,748,898 B2 * | 6/2004 | Ulman et al. ............. | 119/57.92 |
| 7,124,707 B1 * | 10/2006 | Clarke ....................... | 119/51.02 |
| 7,228,816 B2 * | 6/2007 | Turner et al. .............. | 119/51.02 |
| 7,395,782 B1 * | 7/2008 | Lindsay .................... | 119/51.02 |

* cited by examiner

*Primary Examiner*—Thomas Price

(57) ABSTRACT

This invention addresses the problem of how to separately regulate the food intake of multiple animals using the same feeder with the goal of maintaining healthy weight for all. The invention provides a means to prevent access to the feeder by animals that have exceeded their allowance (as dictated by programmable profiles) as well as preventing unauthorized animals (such as excluded pets, wild animals or animals on a special diet). The methods can be applied to a broad range of feeders: for domestic pets, livestock, zoo animals and other managed animals. The invention is particularly well suited to dry food gravity feeders. The invention details electronic and electro-mechanical embodiments of devices intended for the described purpose.

7 Claims, 8 Drawing Sheets

Automatic Feeding System with Motorized Barrier Doors Open (Front View)

ID Transponders (Fitted to Animals)

With Motorized Barrier Doors Closed (Side View)

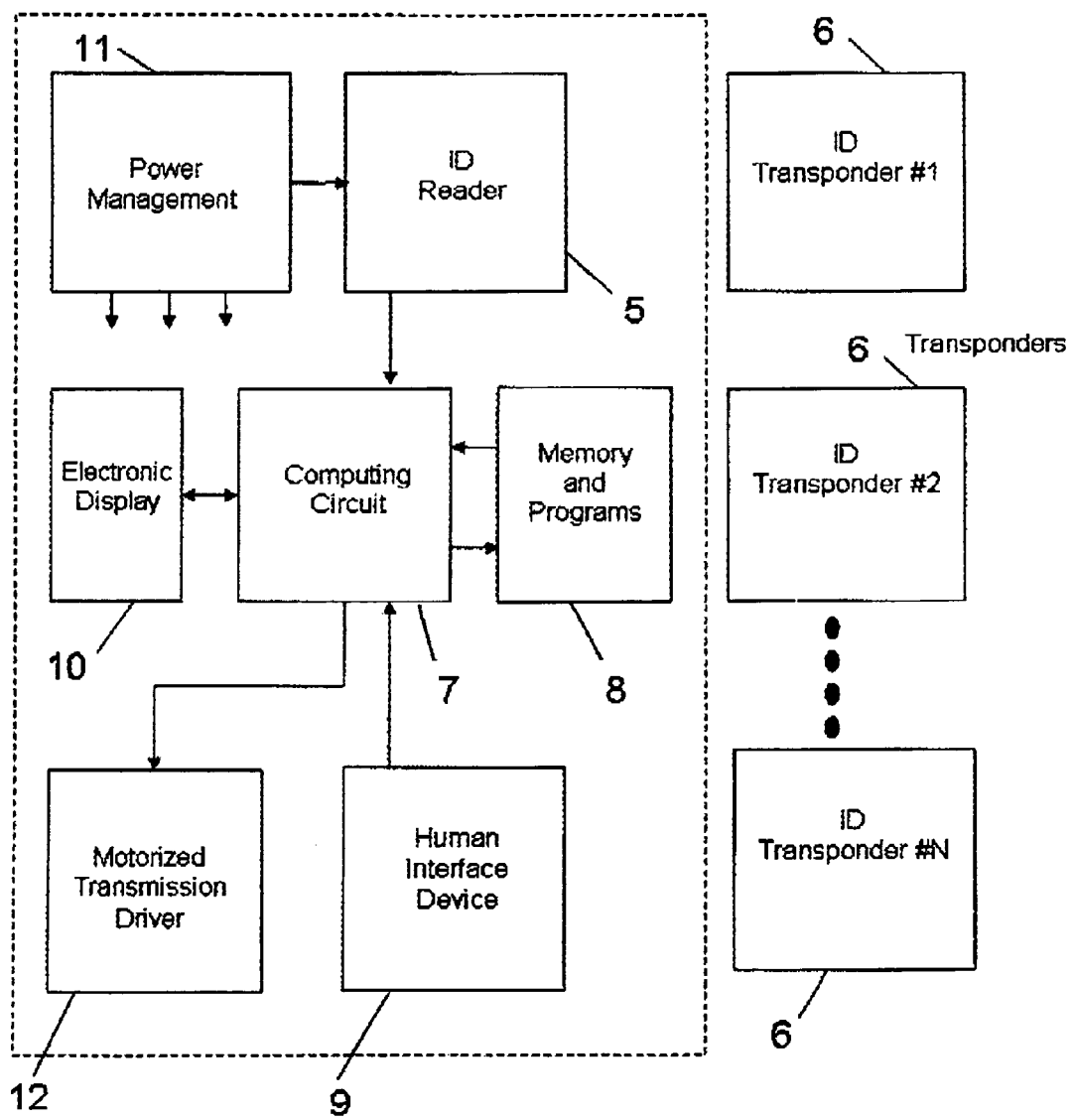
FIG. 2 BLOCK DIAGRAM of Electronics for Automatic Feeding System

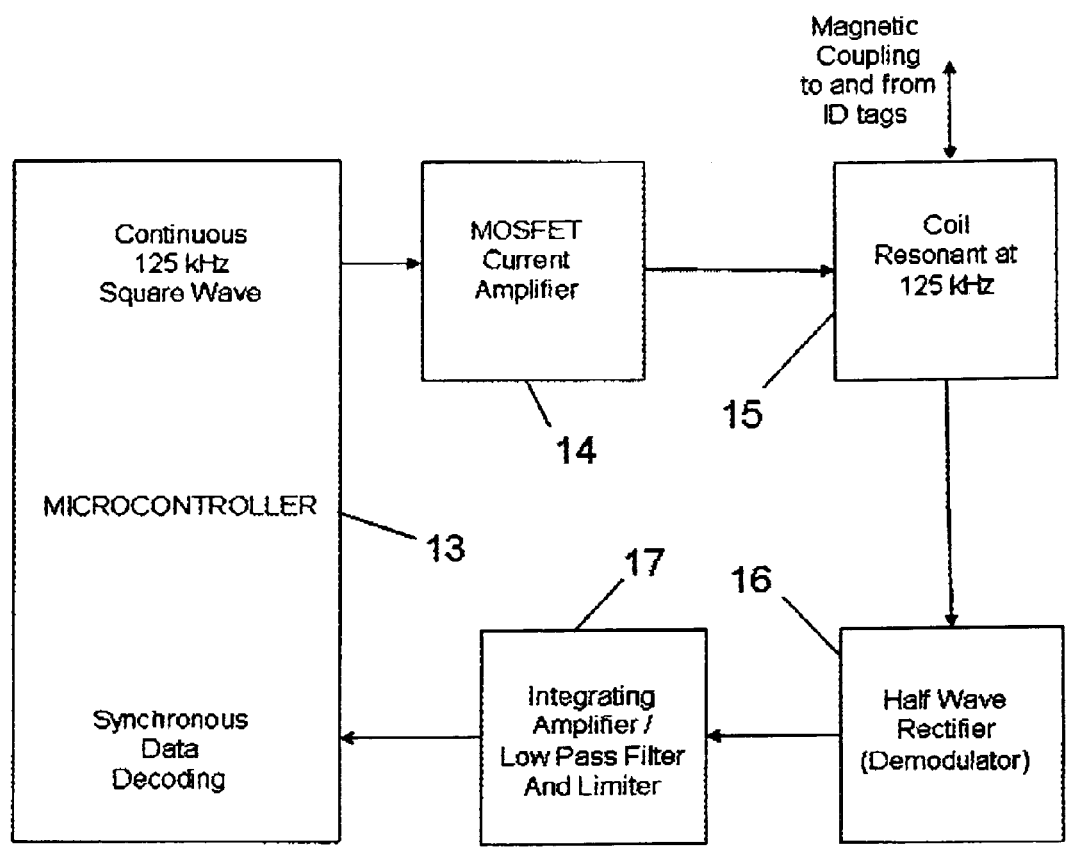

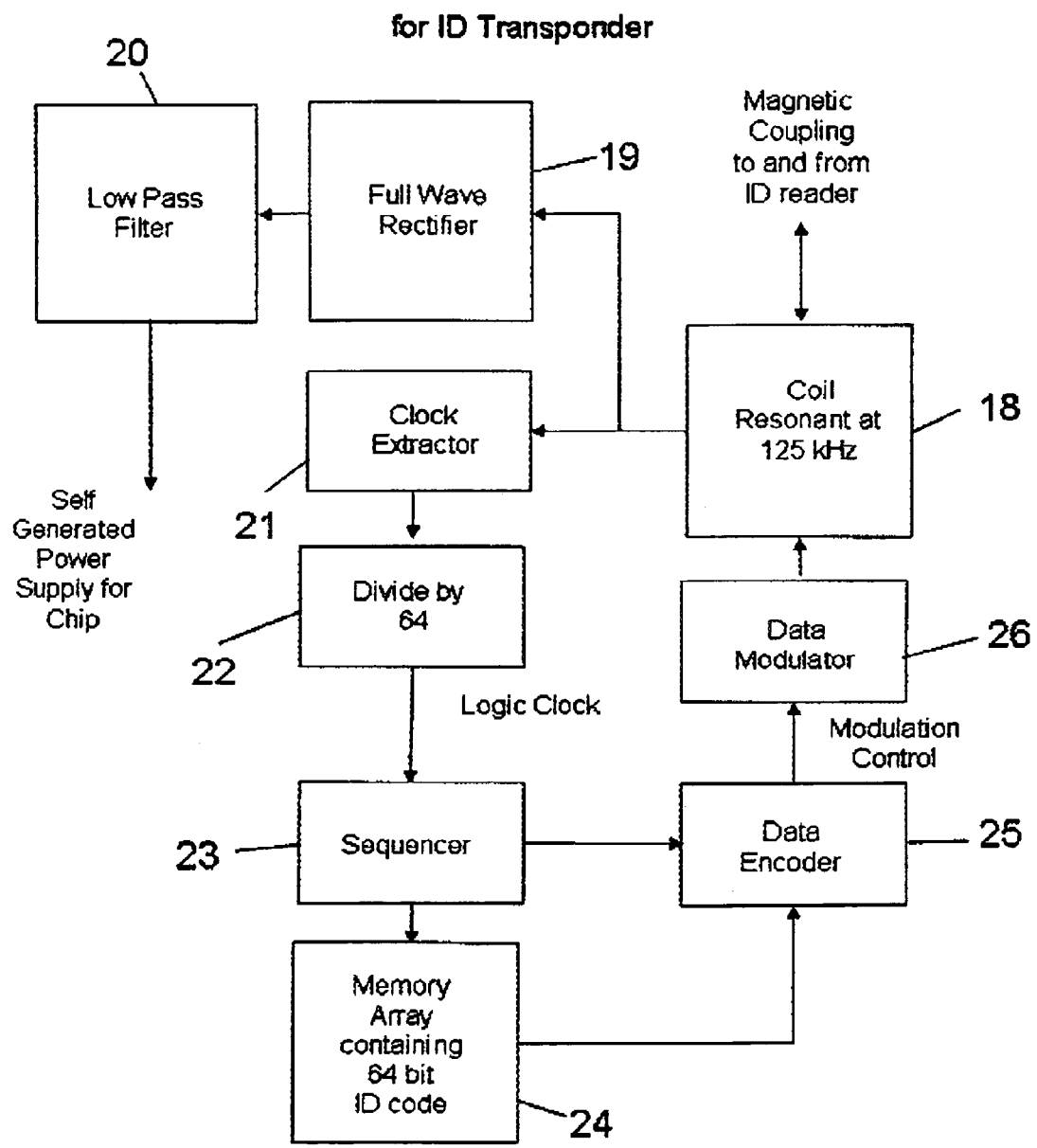

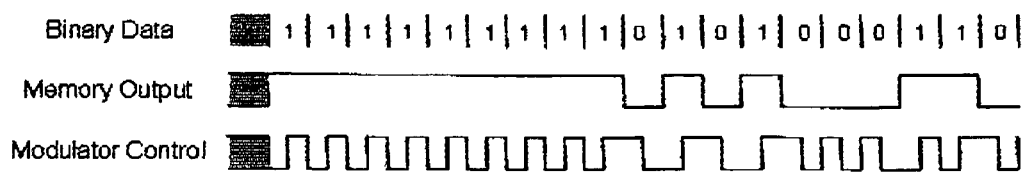
FIG. 5 Manchester Code
Used by ID Transponder

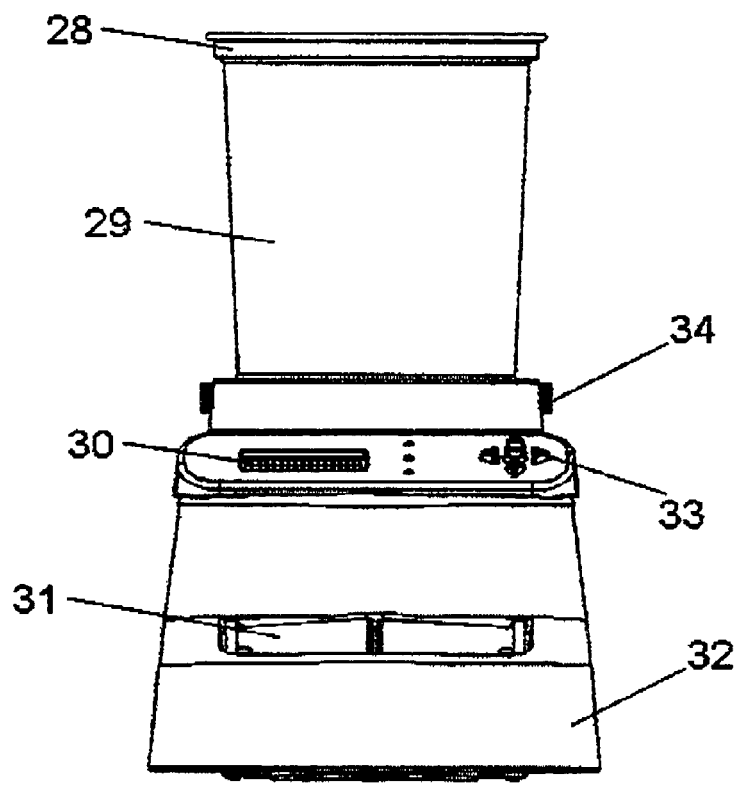
FIG. 6 Front View of a preferred embodiment of Automatic Feeding System

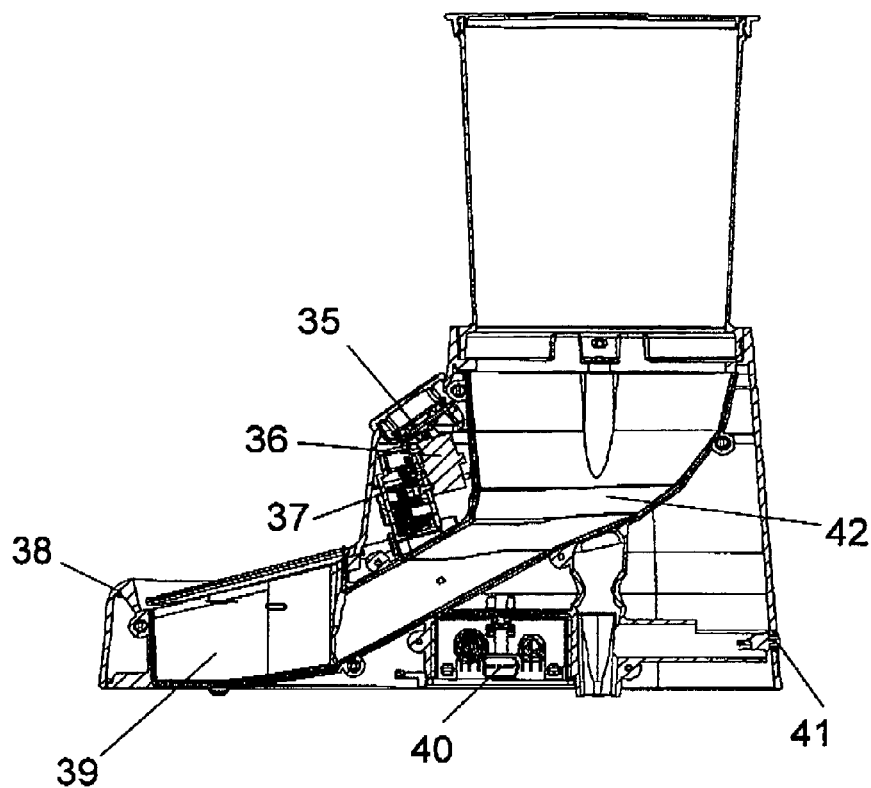
FIG. 7 Section of a preferred embodiment of Automatic Feeding System

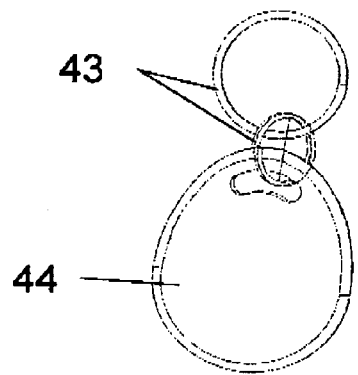
FIG. 8 ID Transponder
(Implemented using CMOS IC and Resonant Coil encapsulated in plastic)

AUTOMATIC FEEDING SYSTEM, DEVICE AND METHOD

FIELD OF INVENTION

The present invention relates to an animal feeding device and more specifically to an automatic feeding system capable of measuring and controlling the food intake of multiple animals.

BACKGROUND OF THE INVENTION

Conventional animal feeders include traditional troughs, feed bowls, etc. Such feeders are generally designed to provide a single meal for one or more animals, and typically restocked manually prior to the next meal. Some automation has been added to such feeders in prior art. One of the simplest being gravity feed: where food is replenished from a storage container by the action of gravity; moving food from the container into spaces left in the food bowl.

Gravity feeders typically use dry food, since moist food tends to spoil after a relatively short time. The problem of spoiling has been partially solved in prior art with feeders having a rotating lid. A portion of the lid is cut away so that a fresh meal is exposed each time the lid rotates. Some variants include refrigerated or ice cooled chambers to keep moist food fresh. The main disadvantage of such systems is that the number of meals is limited, since relatively few food chambers can be accommodated in a reasonable overall size. The construction of these feeders also makes replenishing and cleaning a relatively time consuming task compared to gravity feeders. Similarly, prior art includes refrigerated containers that extrude moist food into a bowl periodically using a drive piston, activated by a timer.

Gravity feeders have also incorporated some automation in prior art, such as employing feed valves to deliver food according to a timer or by physical actuation (learned by the animal). Some other variants supply a measured amount of food each serving. All such methods are quite effective in controlling food intake for solitary animals, but if more than one animal uses the feeder, it is not possible to determine how much each animal intakes. Furthermore, any excess intake by one animal will be at the expense the other animals sharing the feeder.

In a different class of automatic feeder, prior art exists that uses electronic tags to identify each individual animal; in one example electronic tags are fitted to cows to uniquely identify them. The tag is detected at the feeding station and food is dispensed on an individual basis into a trough. However this approach can not guarantee that other cows will not steal the food once it has been dispensed.

Similarly, implanting tags in the body of animals has been proposed in prior art as a means of identification for feeding purposes. In one example, the tag and feeder communicate by an electromagnetic wave traveling between them and the passive tag is powered by the incident electromagnetic wave. In this example, the tag stores feeding information relating to the animal and the feeder dispenses food, based on the presence of the tag and the animal's historical feeding schedule. The system is intended to address the problem of feeding an animal in the owner's absence, and attempts to prevent spoiling/wasting food by dispensing when the animal is absent. However this approach does not address this issue of access prevention for unauthorized animals or regulating the food intake of multiple animals using the same feeder, on an individual basis. In addition using an implanted tag would require an impractically high level of transmitted RF power to power the passive tags in practice and which may also desensitize the receiver.

BRIEF SUMMARY OF THE INVENTION

Gravity feeders are very convenient because they can supply several weeks of food before replenishment is necessary. The main problem with conventional gravity feeders, is that the intake an animal is completely unrestricted, which can result in overweight. Gravity feeders with a dispensing mechanism can limit what is dispensed, but have no control over which animal eats the food in a multi-animal environment.

This invention comprises an electronic circuit to identify authorized animals and permit regulated access to food, while at the same time restricting access by non-desired users (whether unauthorized users or animals exceeding their programmed feed limit). This invention allows the feed time of each animal to be adjusted on an individual basis, so that the weight (and health) of multiple animals can be managed independently. Since eating behavior in animals varies considerably depending on size, age, individual appetite, anxiety and any number of other factors, this present invention includes an electronic circuit to automatically calibrate the maximum daily feeding time for each individual animal, despite such widely varying factors.

BRIEF DESCRIPTION OF THE DRAWINGS

The present invention is illustrated by way of example and not by limitation in the figures of the accompanying drawings and in which:

FIG. 2 shows a block diagram of the major circuit blocks for the FIG. 1 embodiment.

FIG. 3 show a block diagram of a preferred embodiment of an ID reader circuit using magnetically coupled near field technology.

FIG. 4 shows a block diagram of a preferred embodiment of an ID transponder circuit using magnetically coupled near field technology.

FIG. 5 shows a preferred embodiment of the modulation code for a system using magnetically coupled near field technology. The code is commonly known as Manchester code.

FIG. 6 shows the front view of a preferred embodiment of a full integrated improved feeding system using magnetically coupled near field technology.

FIG. 7 shows a section view of a preferred embodiment of a fully integrated improved feeding system using magnetically coupled near field technology.

FIG. 8 shows a preferred embodiment of a ID transponder circuit using magnetically coupled near field technology. The ID transponder circuit is constructed on a single CMOS chip with an off chip resonant coil encapsulated together in plastic.

DETAILED DESCRIPTION OF PREFERRED EMBODIMENTS

Figure 1:
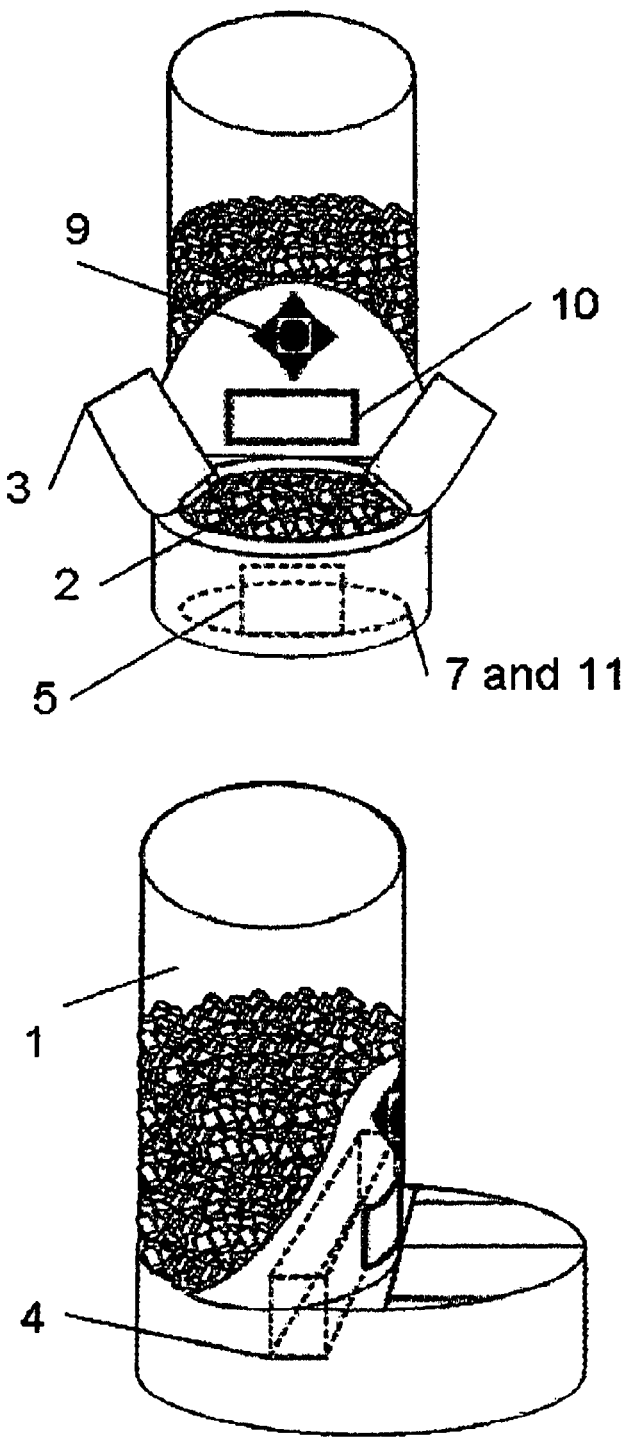
FIG. 1 shows a preferred embodiment of the improved automatic feeding system (feeder) with an identification (ID) reader and ID transponder tags which communicate without the need for a wired connection. The ID information is used by the system to measure and control the feeding behavior of animals.
Figure 1:
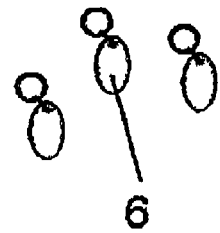

Without limitation to other embodiments that are incremental derivatives from the designs, methods and concepts stated or implied herein. Other objects and advantages of the invention will become apparent upon reading the following detailed description and upon reference to the accompanying drawings in which:

A preferred embodiment of the improved automatic animal feeding system is shown in FIG. 1 comprising: a feed container 1, a food bowl 2, a plurality of powered barrier doors 3, a motorized transmission 4 to drive the doors, an ID reader 5, a plurality of ID transponders 6 fitted to animals using the system, control electronics 7 to implement the systems functions, a human interface device 9, an electronic display 10 and a power management circuit 11. This preferred embodiment is configured for small domestic pets. Whenever an animal is feeding the ID reader 5 detects and reads the ID transponder 6 attached to its collar, without the need for a wired or other structural connection. The ID reader 5 determines the unique ID number communicated by the ID transponder 3 and the control electronics 7 measures the time spent feeding.

FIG. 2 shows a block diagram of the electronics for the improved feeding system in FIG. 1. The circuit blocks comprise: an ID reader 5, a plurality of ID transponders 6, a computing device 7 (which could be implemented using either a microprocessor, microcontroller or state machine), a memory device 8 (for storing software and/or firmware programs), a driver for the motorized transmission 12, an electronic display 10, a human interface device 9 (such as a keypad or touchscreen) and a power management circuit 11.

By means of example, the following describes the operation of the preferred embodiment exemplified in FIG. 1 and FIG. 2 without limitation to other embodiments deriving from or implied herein. The reader 5 attempts to read an ID transponder 6 every few seconds or similar rate. A plurality of software and/or firmware programs is stored in memory 8. The programs are used to identify and register ID transponders and measure the time spent feeding. In addition the programs apply user selected feeding parameters and drive the peripheral components of the system. If an ID transponder 6 is detected, its unique ID number is read (no other information is required since the ID code uniquely identifies the animal wearing it). The ID code is then checked against a registry in memory 8. If the ID is recognized, the computing circuit 7 follows programmable presets and opens the motorized barrier doors 3 (or not) according to the settings and cumulative feeding time of the animal. If a new ID transponder 6 is detected, its ID number is automatically registered and the system enters a training period.

During the training period an algorithm is used for determining typical feeding allowance of an animal; regardless of physical, behavioral or other differences. This algorithm is derived as follows: $Q = \Sigma(k_1 t_1 + k_2 t_2 + k_3 t_3 + \ldots k_n t_n)$ where Q is the cumulative amount consumed during a measurement period, $k_i$ is the speed of consumption and $t_i$ is the elapsed feeding time during a feeding session. The value $k_i$ will vary widely from animal to animal depending on their size and feeding habits and also depends on the calorie content of the type of food used. However the inventor has observed from experiments that for a particular individual, k is approximately constant for any given food type. Meaning: animals typically eat at a constant speed. (The units of speed are immaterial and can be calories/minute, cc/hour, g/second or any other units). Therefore the expression for cumulative amount consumed reduces to $Q = k \cdot \Sigma(t_1 + t_2 + t_3 + \ldots t_n)$.

Drawing attention to the terms in brackets, the series represent the cumulative feeding time during the measurement period. Therefore measuring cumulative feeding time over the training period, allows an accurate prediction of the normal food intake of an animal during any arbitrary interval.

The only requirement is that the training period be long enough to encompass the typical feeding behavior of an animal. Using this principle at the end of the training period, the system automatically calculates the typical daily feed time and sets this as the baseline. This serves to calibrate the feeder for each new animal and does so independent of the size, age, appetite or other characteristics of the animal. Despite such variability, the calibration works because it is an accurate measure of the typical time an animal spends feeding, independent of any other factors. (For example it would not matter if one animal is at the feeder twice as long as another, and eats three times as fast; since this would be normal for both animals and an appropriate baseline).

After the training period, each day the system will allow an animal to feed up to its demonstrated average daily feeding time. If the animal attempts to exceed this amount, the system will automatically close the barrier doors 3, preventing further feeding. If the owner wishes to reduce the weight of any particular animal, this can be done by programming the feeder to decrease the animal's maximum daily feed time to a lower level. Since is done on an individual basis, the feed time of each animal can be adjusted according to its individual nutritional and health needs. In this way the improved automatic feeding system solves the difficult problem of how to control the weight of different animals sharing the same feeder. The fundamental operation of the new feeder works on the principle of measuring the cumulative feeding time relative to a baseline set during a training period and is distinct from prior art feeders which use portion control or meal time scheduling as their method of diet control.

The improved automatic feeding system also includes a class of algorithms to prevent gorging by animals. One of the problems with allowing an animal access to its entire daily allowance is that it may tend to try and eat it all in one session. To avoid this problem the daily allowance established during the training period (or manually set by the owner) can be divided into smaller portions. To do this the day is broken into sub-intervals of such as: 1 hour, 6 hours, 24 hours (no sub-intervals), nighttime and daytime or any other meaningful interval. The available allowance of an animal is incremented after every sub-interval by an amount A/N; where A is the typical daily allowance and N is the number of sub-intervals. Using sub-intervals or "feeding profiles" has a similar effect to reducing portion size of a meal.

Not allowing night feeding is useful for dogs, since they generally want to relieve themselves soon after feeding.

Independent of which feeding profile is selected; if an animal exceeds its available allowance at any instant, the motorized barrier doors 3 close to prevents feeding. If the feeder is visited by another animal that has not exceeded its allowance, the feeder will open. Another unique aspect of this improved feeder is that no food is wasted or available to an unintended recipient, since the doors seal off access once an animal has fed.

In another operating mode: the improved feeder can prevent unauthorized animals from feeding. For example if the feeder is used for cat food and there is a dog in the house, the feeder will exclude the dog if it does not have a valid ID transponder 6 (or if it has an ID that has been designated zero allowance at a particular feeder by the owner).

In another operating mode: if one animal in a household has a special diet (say for diabetes) and other animals in the house eat regular food. By using two separate feeders containing the different food types, the user can easily set up the feeders to accommodate the desired access for the different animals. Similarly cats and dogs can be assigned separate feeders.

In another mode of operation: if certain animals cannot be trained to approach a closed feeder (in order to activate the motorized barrier doors 3). The feeder can be programmed to work in a normally open mode. In which case the animals can see the food and will naturally approach when hungry. In this case, the feeder accumulates the feeding time for each animal and if an animal exceeds its allowance, the feeder closes for a timeout period. In this mode, after the timeout, the feeder will reopen. Obviously the timeout needs to be sufficiently long to deter the animal with no remaining allowance. Even if this animal does re-approach the feeder when it reopens, the feeder will again close.

The motorized barrier 3 in the preferred embodiment comprises two parts that move in opposing rotation powered by a motorized transmission 4. The doors are shown in both open and closed position in FIG. 1. This design has the advantage that inhibits access from all sides of the bowl, except for the front side. In addition the gap between the doors can be made relatively narrow, preventing more than one animal from feeding at the same instant (resulting in a false assessment of individual feeding time).

There are many different wireless circuits that can be used to implement the ID reader 5 and ID transponders 6 such as: magnetically coupled near field technology, infra-red, optical, acoustic, electro-acoustic or RF. In all cases the reader 5 is monitored by a computing device 7, which also handles user inputs from a human interface device 9 and displays on a electronic display 10.

FIG. 3 shows a preferred embodiment of a circuit for the ID reader 5 using magnetically coupled near field technology. Near field communications technology works on the same principle as a voltage transformer: where the primary winding (a.k.a reader) and secondary windings (a.k.a transponder) induce currents through mutual inductance. As a consequence the communications range in near field technology is typically only a few inches. In this application, this is a benefit, since it eliminates the problem of detecting multiple animals near the feeder and ensures only the animal directly in front of feeder is detected. This communications technique is distinct from conventional transmitters and receivers which transmit and receive electromagnetic waves.

The preferred embodiment of the ID reader circuit comprises: a microcontroller 13, a MOSFET current amplifier 14, a resonant coil 15, a half wave rectifier 16 and an integrating amplifier/filter and limiter 17. The microcontroller 13 produces a continuous 125 kHz square wave which is amplifier by a MOSFET current amplifier 14, the amplified signal is routed to a resonant coil 15. The coil can be constructed of wire, wound into a loop with an aperture of a few inches wide. When energized the coil produces an electromagnetic field. If an ID transponder enters the field it modulates the field and encodes it with its unique ID number. This modulation is imparted onto the resonant coil 15 in the ID reader circuit. The signal is then routed to a half wave rectifier 16 used to demodulate the signal, and then cleaned up and enhanced using an integrating amplifier/low pass filter and limiter circuit 17. Finally the signal is synchronously decoded in the microcontroller using a frame structure of 64 bits. The decoded ID number is compared with the IDs stored registered in the system memory 8. If the ID is new, it is registered, if it has already been registered the microcontroller monitors the time elapsed during the feeding session.

FIG. 4 shows a preferred embodiment of a circuit for the ID transponder 6 using magnetically coupled near field technology. The ID transponder comprises: a resonant coil 18, a full wave rectifier 19, a low pass filter 20, a clock extractor 21, a divide by 64 counter 22, a sequencer 23, a memory array 24, a data encoder 25 and a data modulator 26. When the ID transponder enters the field of the ID reader it uses the energy in the field in two ways. First, it rectifies and filters the field to produce a dc current capable of powering itself. Secondly, it extracts the clock from the field and synchronously divides it to a lower rate (divide by 64). A sequencer is then used to align the reduced clock with the contents of the memory. The data is encoded using the commonly known Manchester code, shown in FIG. 5. The encoded data is then modulated onto the original clock and presented to the resonate coil. The alternating phase of the coded data modulates the coil modifying the electromagnetic field. This modified field is in turn imparted onto the resonant coil in the ID reader.

FIG. 6 and FIG. 7 show the front and section views of a preferred embodiment of the automatic feeding system. This embodiment includes all the features exemplified in FIG. 1 through FIG. 5 inclusively. The embodiment comprises: a cover 28, a feed container 29, an LCD display 30, motorized barrier doors 31, a housing shell 32, a keypad 33, lock screws 34 (to hold the container in place), a single PCB containing all the system electronics 35, a motor 36, a gearbox 37, a resonant coil 38, a food bowl 39, a battery box 40, an AC adapter input 41 and a feed chute 42. The electronics in this embodiment are highly integrated on to one PCB and may be powered from either batteries or an ac adapter. FIG. 8 shows a preferred embodiment of the ID transponder. The ID transponder circuit in FIG. 4 is integrated onto a single CMOS IC. The IC and the resonant coil 18 are encapsulated into a plastic tag with two key-ring like fasteners, to allow easy attachment to an animals collar.

What is claimed is:

1. An improved automatic feeding system, comprising: an electronic identification (ID) reader circuit capable of communicating with ID transponders without a wired connection; a plurality of ID transponders to be worn by animals using the feeder; a computing device and circuit using an algorithm to determine the amount fed, by comparing the feeding time of an animal during an arbitrary interval relative to its feeding time during a calibration interval, and an algorithm using this information to calculate individual feeding parameters by comparing with defined or calculated limits in order to intelligently control access to a food source.

2. An improved automatic feeding system as described in claim 1, incorporating a plurality of barrier doors with opposing rotation for the purpose of controlling access to the food supply while simultaneously preventing access by more than one animal at the same instant.

3. An improved automatic feeding system as described in claim 1, utilizing magnetically coupled near field technology or Radio Frequency identification technology (RFID) to implement the reader and ID transponder tags.

4. An improved automatic feeding system as described in claim 1 with embedded logic to prevent unauthorized animals from using the feeder and automatically registering new animal ID tags.

5. An improved automatic feeding system as described in claim 1 with embedded logic to automatically calibrate the feeder for each individual animal, independent of any physical or behavioral differences in order to control the consumption, weight and feeding behavior of animals on an individual basis using programmable feeding profiles.

6. An improved automatic feeding system as described in claim 1 with embedded logic to facilitate the supply of different food types contained by multiple instances of the feeder by locking out selected tag IDs at certain feeders as programmed by the user.

7. An improved automatic feeding system as described in claim 1 and comprising: transparent doors so that the food is always visible to encourage animals to approach even when the feeder is closed; and embedded logic to allow the option of operating in a normally open mode (food source unblocked) if particular animals still will not approach the closed feeder.

* * * * *